(12) United States Patent
Beck

(10) Patent No.: US 6,275,299 B1
(45) Date of Patent: Aug. 14, 2001

(54) MULTIPLE SPOOLER PRINTING SYSTEM

(75) Inventor: Alan Beck, Fremont, CA (US)

(73) Assignee: Apple Computer, Inc., Cupertino, CA (US)

( * ) Notice: Subject to any disclaimer, the term of this patent is extended or adjusted under 35 U.S.C. 154(b) by 656 days.

(21) Appl. No.: 08/632,331

(22) Filed: Apr. 17, 1996

(51) Int. Cl.[7] .................................................. G06F 15/00
(52) U.S. Cl. .................................... 358/1.15; 358/1.16
(58) Field of Search .................................... 395/114, 113, 395/112, 101, 110, 115, 500; 358/407, 468, 467, 1.15, 1.14, 1.13, 1.1, 1.11, 1.16; 400/61, 70, 71, 72, 73, 74, 75, 76; 703/23, 24, 25, 26, 27, 28

(56) References Cited

U.S. PATENT DOCUMENTS 5,220,674 * 6/1993 Morgan et al. .................. 395/110
5,467,434 * 11/1995 Hower, Jr. et al. .................. 395/114
5,580,177 * 12/1996 Gase et al. .................. 395/114

* cited by examiner

*Primary Examiner*—Dov Popovici
(74) *Attorney, Agent, or Firm*—Burns, Doane, Swecker & Mathis, L.L.P.

(57) ABSTRACT

In a printing system having multiple printers, separate print spoolers are launched for each different printer to which a print job is directed. When a document file is sent to a print manager and a spool file is created, the spool file is moved to the specific spooler associated with the printer on which the document is to be printed. Each spooler communicates directly with its associated printer, with respect to all jobs designated for that printer. The various spoolers operate in parallel, and independently of one another. As a result, if one printer is unable to complete a job, the print jobs destined for other printers are not affected, and can be completed.

15 Claims, 2 Drawing Sheets

MULTIPLE SPOOLER PRINTING SYSTEM

FIELD OF THE INVENTION

The present invention is directed to the management of document printing, for example in a computer system, and more particularly to the control of multiple print jobs that are respectively directed to different printers.

BACKGROUND OF THE INVENTION

One of the more prevalent uses of computer systems, particularly desktop computers, is the generation of documents. After a user has created a document through one or more application programs, the user may issue a command to print the document. In some cases, the application program contains information regarding the specific characteristics of the printer on which the document is to be printed. In this case, the application program may interact directly with a printer driver, to send the document data to the printer. More commonly, however, the application program does not directly interact with the printer. Rather, the data to be printed is typically sent to a print manager. The print manager is a set of routines and data types that allow application programs to use standard commands to print text or graphics on a printer. The print manager is designed so that the application programs do not need to call different routines for different kinds of printers. Rather, the application programs call the same printing routines, regardless of the particular printer to which the print job is to be supplied. This type of arrangement is particularly desirable in situations where multiple printers are available, and the user has the option to select any one of them for the printing of a given document.

A typical printing arrangement which employs a print manager is illustrated in FIG. 1. When an application program 10 receives a print command from a user, the program forwards an image of the currently open document to a print manager 12. Upon receipt of the document data, the print manager stores a representation of the document's printed image to a file 14 that is stored in memory. Depending upon the amount of available memory and the size of the file, it can be stored in the computer's random access memory or in a more permanent storage medium, such as a hard disk. This file is often referred to as a spool file. Subsequently, the print manager 12 forwards the spool file to a printer driver 16 associated with the particular printer on which the document is to be printed. The printer driver converts the spool file data into the appropriate printer format, e.g., bit image, and forwards it to the printer, along with appropriate control codes, to cause the document to be printed.

In the example illustrated in FIG. 1, three different printers are available in the computer system. For example, one printer may be a dot matrix type of printer, another printer may be a laser printer, and the third printer may be an inkjet printer. Each printer has a separate printer driver 16 associated with it. In the case of the dot matrix printer and the inkjet printer, the driver communicates directly with the printer, to cause the document to be printed. In the illustrated example, the laser printer is capable of supporting a page-description language, such as PostScript, for example. In this case, the printer driver converts the spool file into the appropriate page description language, which is then passed on to the printer to cause the document to be printed.

One of the advantages associated with the arrangement shown in FIG. 1 is that the print manager can handle multiple print job requests. For example, many computer systems which employ graphical user interfaces offer the capability to issue print commands directly from a file manager, or the like, as well as from within a particular application program. FIG. 2 illustrates an example of a graphical user interface of the type having a desktop 20 on which a user can place icons that represent different available services, such as different printers, as well as data files. In a system such as this, a user can cause a particular document to be printed on a specific printer by dragging the icon for that document onto the icon for the printer. For example, with reference to FIG. 2, the user may drag the icon for Document 1 onto the icon for the dot matrix printer. In response thereto, the printer manager 12 creates a spool file for Document 1. While the spool file is being created, or while the document is actually being printed, the user might drag the icon for Document 2 onto the icon for the laser printer. In response thereto, the print manager 12 creates a second spool file for Document 2. In a similar manner, if the user drags the icon for Document 3 onto one of the printer icons, the print manager creates a spool file for that document.

All of the spool files are stored in a queue by the print manager 12. When the printing of each document is completed, the spool file for that document is deleted by the print manager. After the last document has been printed, the print manager itself shuts down, until a new request to print a document is generated.

Typically, in an arrangement such as that depicted in FIG. 1, all of the print jobs are treated in a sequential manner. Thus, Document 2 is not printed on the laser printer until the printing of Document 1 on the dot matrix printer has been completed. If the dot matrix printer should run out of paper while Document 1 is being printed, the entire printing operation will come to a halt until the user takes some appropriate action. Typically, the user will add more paper to the printer. Alternatively, the user might issue a command to cancel the printing of that document. If the user is not currently available, all of the print jobs will be suspended until such time as an appropriate action can be taken. This result occurs even if the other printers are currently capable of handling the print jobs which are designated for them. Thus, even if the subsequent print jobs are relatively simple, e.g., one page each, they are forced to unnecessarily wait until the appropriate corrective action has been made with respect to the current print job.

Accordingly, it is desirable to provide an arrangement in which multiple print jobs can be managed in a manner that provides greater flexibility, and does not require all print jobs to be suspended if one of them cannot be currently completed.

SUMMARY OF THE INVENTION

In accordance with the present invention, separate print spoolers are launched for each different printer to which a print job is directed. When a document file is sent to the print manager and a spool file is created, the spool file is moved to the specific spooler associated with the printer on which the document is to be printed. Each spooler communicates directly with its associated printer, for all jobs that are designated to be printed on that printer. The various spoolers operate in parallel, and independently of one another. As a result, if one printer is unable to complete a job, the print jobs destined for other printers are not adversely affected, and can be completed.

Although the print jobs are handled independently of one another, the user is unaware of this fact and does not have to access each one through a different path. Rather, all print jobs are managed through a single user interface, so that the user can obtain information regarding the status of any of the currently pending print jobs in a simple manner.

Further features of the invention, as well as the advantages associated therewith, are described in detail hereinafter, with reference to specific examples illustrated in the accompanying drawings.

DETAILED DESCRIPTION

DETAILED DESCRIPTION

To facilitate an understanding of the present invention, it is described hereinafter with reference to its implementation in a desktop computer system. It will be appreciated, however, that the practical applications of the invention are not limited to this particular environment. Rather, the principles of the invention can be employed in any situation in which it is desirable to manage multiple print jobs that are designated for different respective printers.

Figure 3:
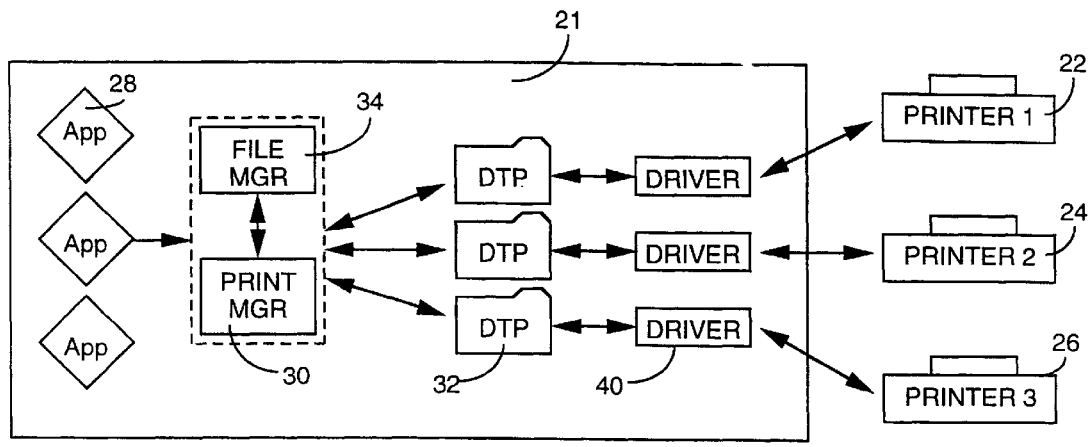
FIG. 3 is a schematic illustration of a printing control arrangement in accordance with the present invention.

Referring to FIG. 3, one embodiment of a printing system in accordance with the present invention is illustrated. In this particular system, documents created within a computer 21 can be printed in one of three different printers 22, 24 and 26 connected to the computer. The user is given the capability to select any one of the three printers for any given document to be printed. For example, the printer 22 may be a high speed, high capacity laser printer that is centrally located within a work environment, and particularly well-suited for large print jobs. The printer 24 may be an inkjet printer which is capable of producing color prints. The third printer 26 may be a dot matrix printer which is located close to the user, and is suitable for small documents and draft documents.

Figure 1:
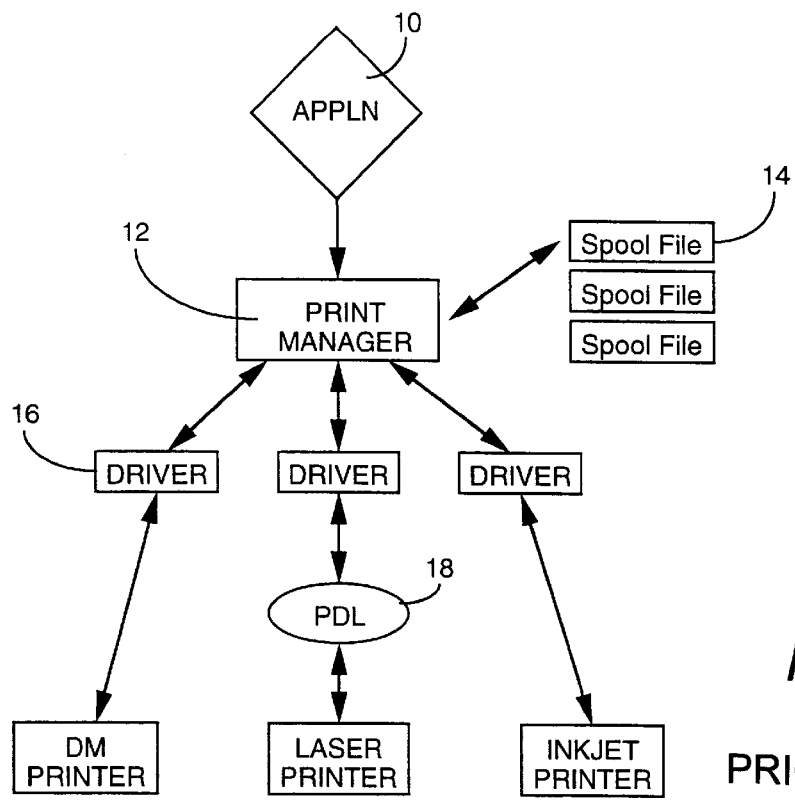
FIG. 1 is a schematic diagram of a typical prior art printing arrangement.
Figure 2:
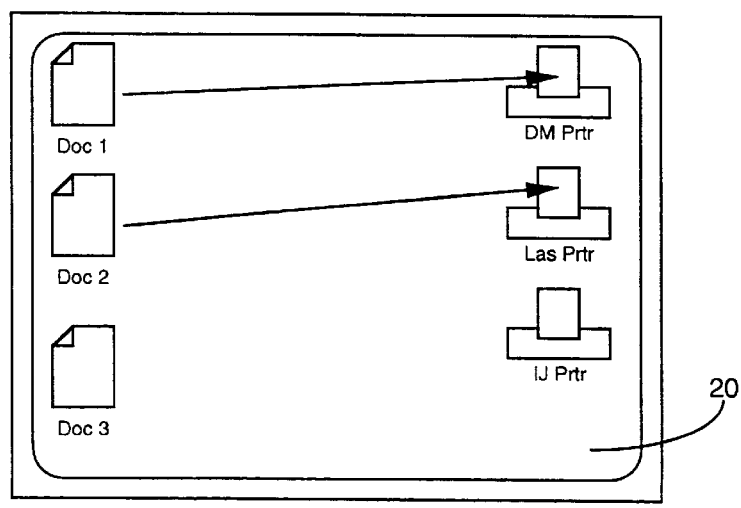
FIG. 2 is an illustration of a display screen from which a user may issue print commands.

Typically, a number of application programs 28 are installed on the computer, and can be used to generate various documents. For example, one program may be a word processor, a second program may be a drawing program, and a third program may be a desktop publishing program. Whenever a user issues a print command from within any of these programs, a file which describes the image of the document to be printed is sent to a print manager 30. Alternatively, as described in connection with FIG. 2, a print command might be generated by dragging an icon which represents a document onto an icon for a particular printer. Upon receiving the document data, the print manager stores a representation of the document's printed image in a spool file.

Each printer that is connected to the computer has an associated data-to-print (DTP) folder 32 stored in the memory of the computer. The DTP folder is a data structure which functions to contain information pertaining to an associated printer. Whenever the print manager creates a spool file, it sends a notification to a file manager 34 for the computer's operating system. One example of such a file manager is the "Finder" that provides a graphical user interface for managing files on computers running the Macintosh operating system. In response to the notification from the print manager, the file manager moves the spool file into the DTP folder 32 for the particular printer on which the document is to be printed. This can be accomplished, for example, by passing a reference to the spool file, such as a pointer, from the print manager 30 to the file manager 34, which is then passed on to the appropriate DTP folder.

Figure 4:
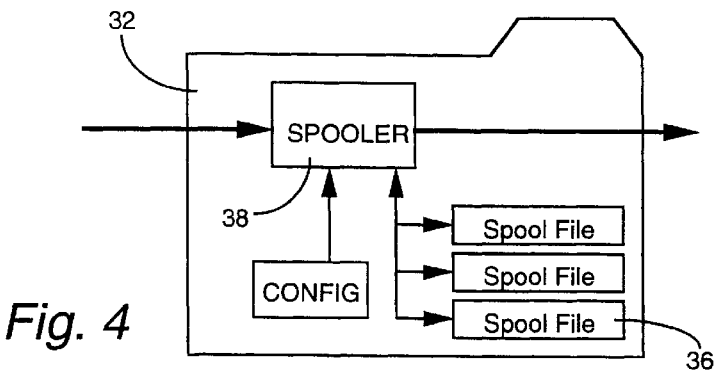
FIG. 4 is an illustration of the contents of one DTP folder.

Referring to FIG. 4, the DTP folder for a printer contains spool files 36 that are placed in it by the file manger, and a spooler application 38 which pertains to the printer with which the DTP folder is associated. The DTP folder can also contain a configuration file which includes information pertaining to the particular printer with which the folder is associated. For example, this information might comprise the identification of a printer driver 40 to which the folder is attached, and the device address of the printer itself, e.g. its serial port or network address.

When the first spool file is placed in a DTP folder, its spooler application 38 is launched. The spooler application functions to provide the spool file to the printer driver 40 for the associated printer. The spooler application has limited knowledge of the specific driver itself, and therefore all of the spoolers can be of a generic type. Each of them comprises a set of routines to provide the spool file to the driver, and to recognize error messages supplied by the driver, such as "out of paper" and the like. In response to such an error message, the spooler application interrupts the feeding of the spool files to the driver, and also notifies the print manager 30 that printing has been halted on its associated printer. In response, the print manager may cause a suitable message to be displayed, to inform the user that some action may be required. The spooler application can also recognize when the designated printer is not present, e.g. it has been disconnected or has not been turned on, and notify the print manager accordingly.

As illustrated in FIG. 4, a separate spooler application is stored in each of the DTP folders. Each of these applications might be a copy of a master spooler program that is stored within the memory of the computer system, for example. As an alternative, it is not necessary to store a separate copy of the spooler application in each folder. Rather, whenever a spooler application is to be launched in response to the forwarding of a spool file to a DTP folder, a new instantiation of the spooler program can be launched from the master program, and associated with the DTP folder to which the file was transferred.

As subsequent print jobs are designated for a particular printer, their spool files 36 are similarly moved into the DTP folder 32 for that printer by the file manager. As each document is printed, its spool file is deleted from the DTP folder by the spooler application. After the last spool file has been deleted, the spooler application itself shuts down until a new request is made to print a document on the associated printer.

From the foregoing, it can be seen that the present invention provides an arrangement in which multiple print jobs destined for different printers can be managed independently of one another. The print manager functions as a dispatcher to provide the spool files to the appropriate DTP folders. Within each folder, all of the jobs for a particular printer are spooled separately from those for other printers. As a result, error conditions existing at one printer do not adversely affect the printing of documents destined for other printers.

Figure 5:
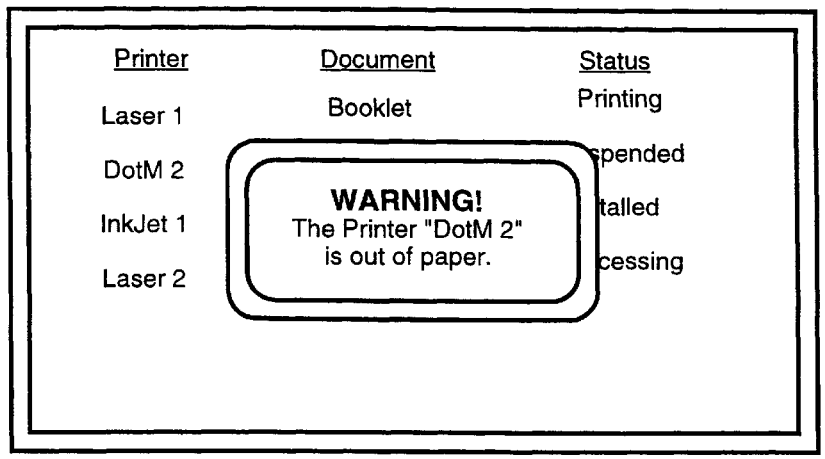
FIG. 5 is an illustration of the user interface for the print manager.

Although the jobs destined for different printers are managed independently of one another via the separate DTP folders, this fact is transparent to the user. Rather, since all print jobs flow through the print manager, a single interface is presented to the user and the application programs that generate the documents. If the user desires to inquire into the status of any particular print job, he is not required to access different paths for the different printers. Rather, all information regarding the print jobs is funneled to the user through the print manager. FIG. 5 illustrates an example of a status window that can be presented to the user by the print manager. As shown therein, all of the information regarding each of the currently pending print jobs is presented to the user in a consolidated manner, and error messages can be displayed in a consistent manner via the print manger, regardless of their source.

In the architecture shown in FIG. 3, the print manager is illustrated as being a separate program from the file manger itself. If desired, all of the functions that are carried out by the print manager can be incorporated into the file manager, to be handled by a single program.

It will be appreciated by those of ordinary skill in the art that the present invention can be embodied in other specific forms without departing from the spirit or essential characteristics thereof. For example, while described in the specific context of a desktop printing system, the principles of the invention can be applied in any environment in which multiple documents are printed on multiple printers. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for managing the printing of documents in a system having multiple printers, comprising the steps of:
    establishing separate data structures comprising folders that are respectively associated with said printers, each of said folders containing an associated spooler program;
    generating a command to print a document on a designated one of said printers;
    generating a data file relating to the document and placing the data file in the folder that pertains to the designated printer;
    launching the spooler program contained in the folder that is associated with the designated printer in response to placing the data file in the folder; and
    transmitting the data from the file to the designated printer via said spooler program.

2. The method of claim 1 wherein the spooler provides the data file to a printer driver that pertains to the designated printer.

3. A printing system, comprising:
    a plurality of printers;
    a plurality of data structures comprising folders stored in a memory, each of said folders being associated with a respective one of said printers;
    a plurality of printer drivers stored in a memory and respectively associated with said printers for providing data to said printers in a format to be printed;
    a print manager for receiving data to be printed and, in response thereto, for creating a file which describes the data to be printed and placing said file in one of said folders; and
    a plurality of print spooler application programs that are contained in respective ones of said folders for reading files provided to the folders to a respective one of the printer drivers;
    wherein each of said print spooler application programs is launched when a file is placed in its associated folder.

4. The system of claim 3 wherein said print manager includes a user interface for displaying information regarding each of said printers to a user.

5. A method for managing the printing of documents in a system having multiple printers, comprising the steps of:
    establishing separate folders that are respectively associated with said printers;
    providing data which relates a document to be printed to a print manager;
    creating a data file which describes the document and storing the data file in memory;
    passing a reference to the data file from the print manager to the folder that pertains to a designated one of said printers on which the document is to be printed;
    launching a spooler program stored in the folder that is associated with the designated printer;
    transmitting the data from the file to a printer driver associated with the designated printer; and
    printing the document on the designated printer.

6. The method of claim 5 further including the step of deleting the data file from the folder when the document has been printed.

7. The method of claim 6 further including the step of closing the spooler program after all data files have been deleted from the folder.

8. A method for managing the printing of documents in a system having multiple printers, comprising the steps of:
    generating a command on a computer to print a first document on a first one of said printers;
    launching a first spooler program on said computer that is associated with the first printer, in response to the generation of said command;
    generating a command on said computer to print a second document on a second one of said printers;
    launching a second spooler program on said computer that is associated with the second printer, in response to the generation of said command of said command to print the second document; and
    transmitting the documents to the respective printers via their associated spoolers
    wherein said first and second spooler programs can operate concurrently.

9. The method of claim 8 further including the step of detecting error conditions pertaining to each of said printers, and displaying error messages to a user via an interface that is common to all of said printers.

10. A printing system comprising;
    a plurality of printers;
    a plurality of printer drivers stored in a memory and respectively associated with said printers for providing data to said printers in a format to be printed;
    a plurality of print spooler application programs that are respectively associated with said printer drivers for reading files to a respective one of the printer drivers; and
    a print manager for receiving data to be printed and, in response thereto, for creating a file which describes the data to be printed and providing the file to one of said print spooler application programs;

each of said print spooler application programs, and said file being contained within a specific data structure which is designated for a respective one of said printers.

11. The system of claim 10 wherein said print manager includes a user interface for displaying information regarding each of said printers to a user.

12. A method for managing the printing of documents in a system having multiple printers, comprising the steps of:

establishing a data structure and a driver for each printer;

providing a spooler program in each data structure;

generating a data file to be printed on one of said multiple printers;

moving said data file to be stored in said data structure;

launching said spooler program in said data structure;

transmitting data from said spooler to said drivers for printing of said document.

13. The method of claim 12, wherein said data structure is a folder.

14. The method of claim 12, wherein if an error occurs with respect to one of said printers, the remaining printers are able to continue operation.

15. A method for managing the printing of documents in a system having multiple printers, comprising the steps of:

establishing separate data structures comprising folders that are respectively associated with said printers;

generating a command to print a document on a designated one of said printers;

generating a data file relating to the document and placing the data file in the folder that pertains to the designated printer;

launching a spooler program that is contained in the folder associated with the designated printer in response to placing the data file in the folder; and transmitting the data from the file to the designated printer via said spooler program;

said generating and launching steps providing an independent path to each printer through the use of separate folders.

* * * * *